March 12, 1946.   B. O. BECK   2,396,238
THERMOSTATICALLY CONTROLLED HEATING UNIT
Filed Nov. 14, 1942

Inventor
Bjorn Oscar Beck.
by
Louis Sheldon
Attys

Patented Mar. 12, 1946

2,396,238

UNITED STATES PATENT OFFICE 2,396,238

THERMOSTATICALLY CONTROLLED HEATING UNIT

Bjorn Oscar Beck, Newark, Ohio, assignor to Newark Stove Company, Newark, Ohio, a corporation of Ohio Application November 14, 1942, Serial No. 465,601

3 Claims. (Cl. 219—37)

This invention relates to an electric cooking range or other electric heating unit for heating purposes and it is concerned with a thermal control for such heating unit.

One object of the invention is to provide a new and improved thermal control device for an electric heating unit.

Another object of the invention is to provide thermostatic means arranged for automatically opening the circuit of an electric heating unit when the unit has attained a predetermined temperature.

A further object of the invention is to provide thermostatic control means for an electric heating unit including means adjustable at will for varying the critical temperature at which the thermostatic means will open the heating circuit.

It is also an object of the invention to provide mounting means for a thermostatic control device designed to secure efficient thermal contact with the element to be controlled and with the thermostatic element itself.

A still further object of the invention is to provide a mounting block for a thermostatic control element formed to protect the element against drafts of air which would alter its temperature and interfere with its proper functioning.

Other objects and advantages of the invention will appear from the following description taken in conjunction with the drawing in which.

Briefly, the present invention comprises a bi-metallic heat-sensitive element which is embedded in a heat-conductive anchor block securely held in impingement with the heating element. The bi-metallic or thermostatic element is horizontally disposed so as to flex in alternative directions and impart vertical motion to an especially designed thrust link. The latter is comprised of three principal sections in alinement, the intermediate one of which affords coarse linear adjustment and the extreme sections of which are non-circular in cross-section so as to be self-confining against rotation and inadvertent creeping to destroy adjustment. One of the extreme elements passes through a rotatable thrust journal which has an extension index that may be positioned to aline with a series of arcuately disposed markings whereby rotation and consequent variation in the longitudinal link assembly length is translatable into a reading on the arcuate index. The ultimate object of the thrust link is the engagement of a micro-switch mechanism whose contacts are in circuit with the heating element and whereby current is instantaneously cut off and on in response to the flexing variations of the thermostatic element.

The principal purpose of the instant apparatus is to afford critical adjustment in the operating features of a thermostatic control switch. Another advantage is that the range of possible temperature variation is continuous instead of comprising a small number of fixed positions as when a conventional multiple-heat switch is employed. With the thermostatic control, the heating unit may be set for a preheating treatment that permits the food in the pan to be brought to the boiling point or to any other desired temperature without undesirable shut-off periods before it reaches the desired temperature.

Figure 1:
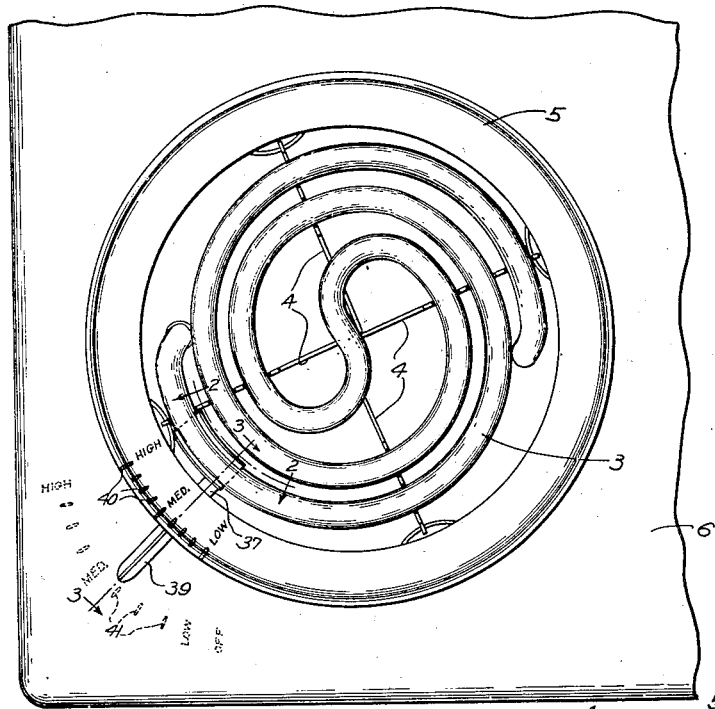
Fig. 1 is a top plan view of a rod type electric heating unit with a thermal control device embodying this invention attached thereto.
Figure 2:
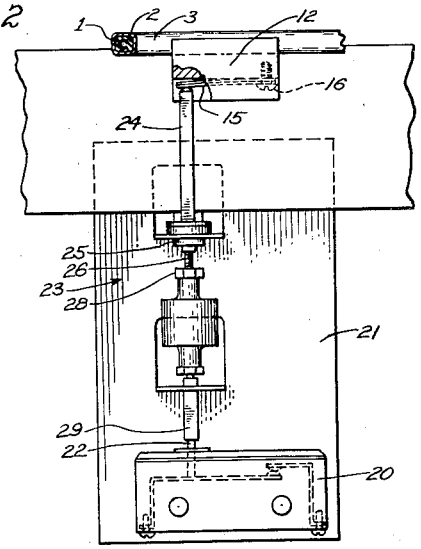
Fig. 2 is a vertical sectional detail view of the thermostatic control device and the switch which it operates, being taken substantially as a section at line 2—2 on Fig. 1.

The drawing shows this invention as applied to a rod type electric heating unit adapted for use in an electric range or hot plate for cooking purposes. Such a unit usually consists of a conductor wire of suitable composition helically coiled and imbedded in suitable electrical insulation which in turn is enclosed in a tubular metallic "rod." Such a conductor is indicated at 1 in Fig. 2 surrounded by insulating material 2 and enclosed in a metallic tubular rod or casing 3. The tubular rod 3 is shown in Fig. 1 as bent into a double involute forming a grid with its upper surfaces lying in a horizontal plane for contact with the bottom of cooking vessels. In the stove structure the rod type heater 3 rests upon supporting cross-bars 4 carried by an adapter ring or frame 5 which is set into the top wall 6 of the stove structure. Suitable conductor wires (not shown) are connected to the ends of the heater wire 1 to furnish electric current thereto. Such wires are indicated diagrammatically at 7 and 8 in Fig. 4 as extending from a manual switch 9 into which the feed wires 10 and 11 lead as also indicated in the diagram.

Figure 3:
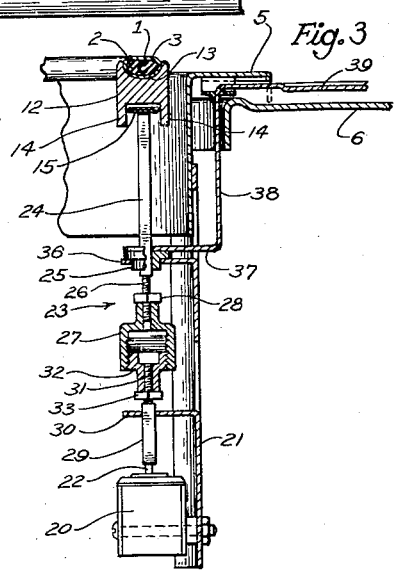
Fig. 3 is a sectional detail view taken substantially as indicated at line 3—3 on Fig. 1.

For the purpose of this invention a mounting block 12 of bronze or other relatively good heat conducting material is secured in efficient thermal contact with the undersurface of the rod type heating unit 3 at any convenient point in its length. The upper surface of the block 12 is channeled at 13 to conform to the rounded undersurface of the tubular rod 3 as seen in Fig. 3 so that it fits snugly in contact therewith and the block 12 may be secured in position by brazing it to the part 3, or if the contour of the member 3 will permit, the upper edges of the channel 13 may be crimped over slightly to retain the block in position. The under surface of the block 12 is provided with depending flanges 14 spaced apart to form a channel in which a bimetal strip 15 is secured as by means of a screw 16 engaging the strip near one end. The opposite end is left free to flex and the arrangement of the bimetallic components of the strip is such that upon increase of temperature it will flex downwardly and away from the mounting block 12.

A switch box 20 is fixedly supported by a plate 21 at a position below that of the block 12 and the switch mechanism, which may be of any suitable and known type and which is not illustrated in detail, includes a plunger or button 22 projecting upwardly from the box or casing 20. The switch is arranged to be normally closed but it will be opened upon depression of the button 22. An actuating member for the switch button 22 is designated in its entirety by numeral 23 and consists of two square cross-sectional rod portions extending between the button 22 and the bimetal strip 15. The upper portion 24 engages the under surface of the strip 15 and extends through a rotatable bushing 25 in which it is vertically slidable. The lower end of the portion 24 is threaded at 26 and screwed into a hollow coupling member 27 and a locknut 28 securing this threaded connection against easy turning. The lower part of the actuating rod is shown at 29 in contact with the button 22 and extending upwardly therefrom through a fixed guide member 30, in which it is vertically slidable. The upper end of the rod 29 is threaded at 31 and screwed into a coupling member 32 with a locknut 33 securing this connection. The coupling members 27 and 32 are of considerably greater diameter than the rod figures 24 and 29 and these members are cut with relatively coarse threads by which they are connected to each other.

Figure 4:
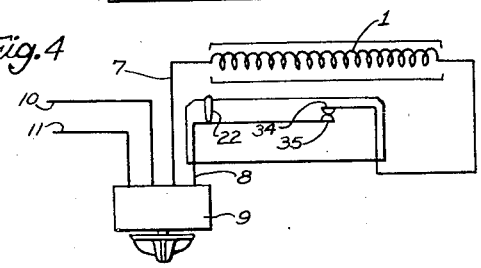
Fig. 4 is a wiring diagram for the heating unit and its thermostatic control.

When the manual switch 9 is closed the current, flowing through the conductor 1 heats the conductor and its enclosing tubular rod 3. Heat is then transmitted through the mounting block 12 to the bimetal strip 15 which begins to bend downwardly so that at a predetermined temperature the deflection of its free end is sufficient to actuate the switch at 20. The strip 15 pressing downwardly against the rod 24 moves the total assembly which constitutes the actuating member 23 downwardly and trips the switch button 22 which opens the switch in the casing 20. This switch is connected in series with the conductor 1 as indicated in Fig. 4, the contacts of the switch being denoted diagrammatically at 34 and 35 although it may be understood that the actual construction of the switch may include a snap action mechanism or other means of securing a quick break to avoid arcing. After the switch at 20 is opened the heating unit 3 cools and the bimetal strip 15 also cools and returns to its normal condition thus releasing its pressure against the part 24 of the actuating member 23 and allowing the switch mechanism within the casing 20 to close the switch automatically. This can be arranged to occur upon a relatively slight drop in the temperature of the heating unit 3 so that upon closing the circuit the unit is promptly brought back to the desired temperature and the current is again cut off automatically by the thermostatic mechanism. Thus the temperature of the heating unit is maintained indefinitely within a very few degrees of the desired critical value.

For varying the critical temperature at which the plunger 22 will be depressed to open the switch at 20 the effective length of the actuating member 23 is altered. This is accomplished by rotative adjustment of the part 24 relative to the part 29, which rotates the coupling member 27 relatively to the coupling member 32 and, by virtue of the threaded connection between said coupling members, causes one of them to move longitudinally with respect to the other. The part 29 and its coupling member 27 are held against rotation by virtue of the fact that the part 29 is of square or other non-circular cross section and fits in a correspondingly shaped guide opening in the guide lug 30 shown in Fig. 3 as bent to extend horizontally from the plate 21. The part 24 is also of non-circular cross section and extends slidably through a correspondingly shaped bore in the bushing 25. Said bushing is rotatively mounted in a lug 36 bent to extend horizontally from the plate 21 as seen in Fig. 3; and an adjusting lever arm 37 rigidly secured to the bushing 36, extends horizontally therefrom and is bent to extend vertically at 38 and again horizontally at 39, the latter portion of the lever serving as its operating handle as seen in Fig. 1. Suitable scale markings may be provided either on the adapter or bezel ring 5 as shown at 40 or on the top surface of the stove wall 6 as indicated at 41 in Fig. 1, it being understood that only one set of graduations will be required. Thus upon swinging the lever 39 so as to rotate the bushing 25 through a limited angle the upper part 24 of the actuating member 23 will be rotated about its axis and the threaded coupling member 27 will be turned relatively to the coupling member 32 and rod 29 thus lengthening or shortening the actuating member 23 depending upon the direction in which the lever arm 39 is swung. This adjustment will alter the temperature at which the deflection of the bimetal bar 15 will be sufficient to trip the switch button 22 and open the circuit.

It will be evident that by making the coupling members 27 and 32 considerably larger in diameter than the rod sections 24 and 29 it is possible to provide threads on these larger coupling parts which will have sufficient pitch to cause the desired longitudinal adjustment with only a partial turn of one terminal with respect to the other.

It may be understood that the switch enclosed in the casing 20 may be either of the single pole type or of the double pole type. As indicated in the wiring diagram 24 it is assumed to be of the single pole type and in this case a separate manual switch 9 is required in the circuit for turning the current off and on. If a double pole switch is employed in the casing 20 the thermostat adjusting arm 39 may have an "off" position as included in the alternative graduations marked at 41 on Fig. 1 since the range of adjustment of the actuating member 23 may include a position at which it will hold the switch contacts open when the heating element 3 is cold.

With either type of switch there will be included suitable yielding means operating as a reset mechanism to return the switch contacts to closing position when the pressure of the bimetal bar 15 is released from the plunger 22 by cooling of the heating unit 3. The switch as shown is carried by the plate 21 which in turn is supported from the adapter ring or bezel 5 so that the thermostatic control is practically self-contained with the heating unit and can be readily fitted into the stove or removed therefrom, requiring only the connection of the lead wires to complete the assembly ready for use.

While there is shown and described herein certain specific structure embodying the invention, it will be manifest to those skilled in the art that various modifications and rearrangements of the parts may be made without departing from the spirit and scope of the invention, and that the same is not limited to the particular forms herein disclosed, except in so far as indicated by the appended claims.

I claim:

1. In combination with an electric heater, a bimetallic element secured adjacent the heater with a portion of said element free to flex in response to temperature change, a control switch connected in circuit with said heater, an actuating rod composed of two parts in longitudinal alignment, a pair of coupling members threaded into one another and each having threaded engagement with one of said actuating rod parts, one of said rods parts being non-circular in cross-section, a bushing having a non-circular opening in which said part is fitted and in which it is axially slidable, manually operable means to rotatively adjust the bushing, said other part of the rod being also non-circular in cross-section, and a guide through which it is slidable, said guide having a non-circular formation holding the rod part against rotation.

2. A thermostatic switch controlling mechanism, comprising in combination a horizontally disposed heating element, a heat conducting anchor block in contact with said element, a micro-switch mechanism disposed vertically beneath said block, a bimetallic member anchored in said block having one end free to flex in response to environmental heat conditions, and a linkage for imparting thrust movements of said bimetallic element against said micro-switch mechanism comprising a first rod section journaled in a journal bushing for vertically sliding motion and having a threaded end, a second section confined in a guide bracket, and in longitudinal alinement with said first section having a threaded end, and an intermediate coupling assembly comprising two mutually interfitting screw threaded members, and threaded portions on each for threaded engagement with said first and second rod sections, whereby longitudinal adjustment may be effected by relative rotation between said coupling elements and additionally thereto subservient adjustment may be effected by the rotation of said first rod section journal bushing.

3. A thermostatic switch-controlling mechanism for use with a horizontally disposed surface heating element, said mechanism comprising a heat conducting anchor block in contact with said element, a micro-switch mechanism disposed vertically below said block, a bimetallic member anchored in said block having one end free to flex in response to environmental heat conditions, and a linkage for imparting thrust movements of said bimetallic element against said micro-switch mechanism comprising a first rod section journaled in a journal bushing for vertically sliding motion and having a threaded end, a second section confined in a guide bracket in longitudinal alinement with said first section and having a threaded end, and an intermediate coupling assembly comprising two mutually interfitting screw threaded members, and threaded portions on each for threaded engagement with said first and second rod sections, whereby longitudinal adjustment may be effected by relative rotation between said coupling elements and additionally thereto subservient adjustment may be effected by the rotation of said first rod section journal bushing.

BJORN OSCAR BECK.